(12) United States Patent
Maekawa et al.

(10) Patent No.: US 10,302,437 B2
(45) Date of Patent: May 28, 2019

(54) NAVIGATION DEVICE AND NAVIGATION METHOD

(71) Applicant: TOYOTA JIDOSHA KABUSHIKI KAISHA, Toyota-shi, Aichi-ken (JP)

(72) Inventors: Kazuteru Maekawa, Miyoshi (JP); Seiji Takahata, Nishio (JP); Yuka Matsuo, Toyoake (JP); Kazunori Watanabe, Okazaki (JP); Xin Jin, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 15/070,701

(22) Filed: Mar. 15, 2016

(65) Prior Publication Data
US 2016/0273925 A1    Sep. 22, 2016

(30) Foreign Application Priority Data

Mar. 18, 2015 (JP) .................................. 2015-054801

(51) Int. Cl.
*G01C 21/30* (2006.01)
*G01C 21/32* (2006.01)

(52) U.S. Cl.
CPC ............. *G01C 21/30* (2013.01); *G01C 21/32* (2013.01)

(58) Field of Classification Search
CPC ........ G01C 21/30; G01C 21/20; G01C 21/32; G01C 21/3673
USPC ........................................................ 701/430
See application file for complete search history.

(56) References Cited

U.S. PATENT DOCUMENTS

| | | | | |
|---|---|---|---|---|
| 5,442,559 A * | 8/1995 | Kuwahara | .............. | G01C 21/30 340/990 |
| 5,742,924 A * | 4/1998 | Nakayama | ......... | G01C 21/3635 340/995.14 |
| 6,178,377 B1 * | 1/2001 | Ishihara | ................. | G01C 21/30 340/995.12 |
| 6,542,816 B1 * | 4/2003 | Ito | .......................... | G01C 21/32 340/905 |
| 6,597,987 B1 * | 7/2003 | Barton | ................... | G01C 21/30 340/988 |
| 6,622,085 B1 * | 9/2003 | Amita | .................... | G01C 21/32 340/990 |
| 7,412,089 B2 * | 8/2008 | Squires | ................ | G06K 7/1443 382/103 |
| 7,477,269 B2 * | 1/2009 | Sumizawa | ......... | G01C 21/3676 345/619 |

(Continued)

FOREIGN PATENT DOCUMENTS

JP    2005-265574 A    9/2005

*Primary Examiner* — Angelina Shudy
(74) *Attorney, Agent, or Firm* — Oliff PLC

(57) ABSTRACT

In a case where a specific position is designated in first road network data, first link group identification data containing a link, on which the specific position is present, is acquired, and a corresponding link group, which is a link group indicated by second link group identification data, corresponding to the first link group identification data, is extracted from second road network data. A corresponding position on a link contained in the corresponding link group, which corresponds to the specific position, is determined, and second information is acquired from second map data based on the corresponding position.

6 Claims, 7 Drawing Sheets

(56) References Cited

U.S. PATENT DOCUMENTS

| | | | | |
|---|---|---|---|---|
| 7,493,212 B2* | 2/2009 | Sumizawa | G01C 21/367 | 340/990 |
| 8,219,314 B2* | 7/2012 | Adachi | G01C 21/30 | 340/995.19 |
| 8,682,578 B2* | 3/2014 | Okude | G01C 21/32 | 701/400 |
| 8,892,517 B2* | 11/2014 | Takahata | G08G 1/0969 | 707/625 |
| 8,930,135 B2* | 1/2015 | Abramovich Ettinger | G01C 21/3476 | 340/995.19 |
| 9,066,018 B2* | 6/2015 | Nishimura | G01C 21/3647 | |
| 9,082,008 B2* | 7/2015 | Ma | G01C 21/005 | |
| 9,816,826 B2* | 11/2017 | Renz | G01C 21/32 | |
| 9,854,394 B1* | 12/2017 | Haney | H04W 4/21 | |
| 2002/0004701 A1* | 1/2002 | Nakano | G01C 21/32 | 701/532 |
| 2002/0120398 A1* | 8/2002 | Matsuda | G01C 21/20 | 701/433 |
| 2002/0128768 A1* | 9/2002 | Nakano | G01C 21/32 | 701/533 |
| 2004/0027344 A1* | 2/2004 | Ohto | G06F 17/5004 | 345/419 |
| 2005/0058155 A1* | 3/2005 | Mikuriya | G01C 21/32 | 370/474 |
| 2005/0131631 A1* | 6/2005 | Nakano | G01C 21/3492 | 701/532 |
| 2007/0073471 A1* | 3/2007 | Abe | G01C 21/32 | 701/532 |
| 2008/0033642 A1* | 2/2008 | Emoto | G01C 21/3638 | 701/436 |
| 2008/0082255 A1* | 4/2008 | Takahata | G01C 21/32 | 701/533 |
| 2008/0091344 A1* | 4/2008 | Mikuriya | G01C 21/32 | 701/450 |
| 2008/0201073 A1* | 8/2008 | Adachi | G01C 21/30 | 701/414 |
| 2009/0177706 A1* | 7/2009 | Takahata | G01C 21/32 | |
| 2010/0179755 A1* | 7/2010 | Kohno | G01C 21/32 | 701/532 |
| 2010/0268448 A1* | 10/2010 | Doan | G01C 21/367 | 701/533 |
| 2010/0274469 A1* | 10/2010 | Takahata | G01C 21/32 | 701/532 |
| 2012/0143886 A1* | 6/2012 | Okude | G01C 21/32 | 707/756 |
| 2013/0006925 A1* | 1/2013 | Sawai | G06F 16/29 | 707/609 |
| 2013/0050204 A1* | 2/2013 | Samokhin | G01C 21/3638 | 345/419 |
| 2013/0261968 A1* | 10/2013 | Sakairi | G01C 21/32 | 701/533 |
| 2013/0275428 A1* | 10/2013 | Sakairi | G01C 21/32 | 707/736 |
| 2013/0297644 A1* | 11/2013 | Sakairi | G01C 21/32 | 707/758 |
| 2014/0125655 A1* | 5/2014 | Kunath | G06T 15/005 | 345/419 |
| 2016/0275715 A1* | 9/2016 | Matsuo | G06T 19/20 | |
| 2017/0278402 A1* | 9/2017 | Yalla | G08G 1/167 | |

* cited by examiner

NAVIGATION DEVICE AND NAVIGATION METHOD

INCORPORATION BY REFERENCE

The disclosure of Japanese Patent Application No. 2015-054801 filed on Mar. 18, 2015 including the specification, drawings, and abstract is incorporated herein by reference in its entirety.

BACKGROUND OF THE INVENTION

1. Field of the Invention

The invention relates to a navigation device performs guidance by using first map data containing first information and second map data containing second information which is not contained in the first map data, the coordinates of both of which overlap with each other.

2. Description of Related Art

A navigation device is widely used to display a host position or to guide a path to a destination by using road map information. The road map information used by the navigation device may contain different types of data such as data for searching a path and background data. Actual roads, landforms, or the like are frequently changed due to new construction and integration of roads, land development, or the like. That is, since actual roads or landforms do not match the road map information, preferably, the road map information used by the navigation device is properly updated. As described above, the road map data may contain different types of data, and in many cases, update timings of data are different from each other. As a result, an inconsistency among the different types of data may occur, for example, a mismatch between guidance paths and roads displayed on a display device may occur such that a user cannot comprehend the content displayed.

Japanese Unexamined Patent Application Publication No. 2005-265574 (JP 2005-265574A) discloses a navigation device that tones down and displays an inconsistent portion in a case where there is an inconsistency between data for searching a path and background data (map display data). In a case where there is an inconsistency in an updated state, it is possible to visually notify a user of the occurrence of inconsistency of data by displaying an inconsistent portion in a different manner. Accordingly, even if incomprehensible display appears, the user can continuously drive a vehicle without becoming confused (refer to 45 to 47 paragraphs, FIG. 5, and the like in JP 2005-265574A).

Technology disclosed in JP 2005-265574A is capable of clearly notifying a user of the occurrence of inconsistency of data without confusing the user. In contrast, it is not possible to reduce the occurrence of phenomena caused by the inconsistency of data, for example, the occurrence of such a phenomenon that a map is not partially displayed. For example, even if inconsistency of data occurs, road map information is preferably displayed matching as closely to actual roads or landforms as possible, and a phenomenon caused by the inconsistency of data is preferably eliminated as much as possible.

SUMMARY OF THE INVENTION

In light of the aforementioned background, it is desirable to provide technology of maintaining a correspondence between different types of map data as much as possible, even if there is an inconsistency between updated states of the map data items in a navigation device using multiple map data items which are independently updated.

According to an aspect of the invention, there is provided a navigation device that performs guidance by using first map data containing first information, and second map data which is map data for a region in which coordinates of the second map data overlap coordinates of the first map data, and contains second information not contained in the first map data, the device including: a map data storage unit; a data updating unit; a corresponding link group extraction unit; a corresponding position determination unit; a second information acquisition unit; and a guiding unit. The first map data contains first road network data indicating roads based on a connection relationship between multiple links, and first link group identification data identifying a first link group which is a link group formed of multiple continuous links in the first road network data. The second map data contains second road network data indicating roads based on a connection relationship between multiple links, and second link group identification data identifying a second link group which is a link group formed of multiple continuous links in the second road network data. A correspondence between the second link group identification data and the first link group identification data is established. The map data storage unit stores the first map data and the second map data. The data updating unit is capable of independently updating the first road network data and the second road network data. In a case where a specific position is designated in the first road network data, the corresponding link group extraction unit acquires the first link group identification data containing a link on which the specific position is present, and extracts a corresponding link group, which is a link group indicated by the second link group identification data, corresponding to the first link group identification data, from the second road network data. The corresponding position determination unit determines a corresponding position on a link contained in the corresponding link group, which is a position corresponding to the specific position, by making at least one determination of a determination based on attribute information regarding links in the vicinity of the specific position in the first road network data and attribute information regarding links in the vicinity of the specific position in the second road network data, and a determination based on coordinate information regarding the specific position and the attribute information regarding the links in the vicinity of the specific position in the second road network data. The second information acquisition unit configured to acquire the second information from the second map data based on the corresponding position, The guiding unit performs guidance by using the second information acquisition unit.

In this configuration, a table or the like for directly associating the first map data with the second map data is not provided. In contrast, since a correspondence between the second link group identification data and the first link group identification data is established, it is possible to indirectly associate the second map data with the first map data. Accordingly, even in a case where the first map data cannot be directly associated with the second map data due to different update timings, it is possible to associate the first map data with the second map data by verifying the first link group identification data and the second link group identification data. With regard to this association, the corresponding position determination unit determines the corresponding position corresponding to the specific position. In a case where a relatively large difference in the road network data is present between the first map data and the second map data, the first map data cannot be associated with the second map data. For this reason, it is possible to avoid establishment of an improper correspondence. As such, in this configuration, it is possible to maintain a correspondence between different types of map data as much as possible, even if there is an inconsistency between updated states of the map data items in the navigation device using multiple map data items which are independently updated.

Various technical characteristics of the navigation device can also be applied to a navigation method and a navigation program. Hereinafter, representative aspects will be exemplarily illustrated. The navigation method is capable of having the characteristics of the navigation device. The navigation program is capable of causing a computer to realize various functions including the characteristics of the navigation device. Naturally, the navigation method and the navigation program are also capable of having effects of the navigation device. Various additional characteristics exemplarily illustrated as preferred aspects of the navigation device in the following description of embodiments can also be incorporated into the navigation method or the navigation program. The method and the program are capable of providing effects corresponding to the additional characteristics.

According to an aspect of the invention, there is provided a navigation method by which guidance is performed by using first map data containing first information, and second map data which is map data for a region in which coordinates of the second map data overlap coordinates of the first map data, and contains second information not contained in the first map data, the method including: data updating; corresponding link group extracting; corresponding position determining; second information acquiring; and guiding. The first map data and the second map data are stored in a map data storage unit, and the first map data contains first road network data indicating roads based on a connection relationship between multiple links, and first link group identification data identifying a first link group which is a link group formed of multiple continuous links in the first road network data. The second map data contains second road network data indicating roads based on a connection relationship between multiple links, and second link group identification data identifying a second link group which is a link group formed of multiple continuous links in the second road network data. A correspondence between the second link group identification data and the first link group identification data is established. The first road network data and the second road network data can be independently updated by a data updating unit. In a case where a specific position is designated in the first road network data, a corresponding link group is extracted in such a way that a corresponding link group extraction unit acquires the first link group identification data containing a link on which the specific position is present, and extracts the corresponding link group, which is a link group indicated by the second link group identification data, corresponding to the first link group identification data, from the second road network data. A corresponding position is determined in such a way that a corresponding position determination unit determines the corresponding position on a link contained in the corresponding link group, which is a position corresponding to the specific position, by making at least one determination of a determination based on attribute information regarding links in the vicinity of the specific position in the first road network data and attribute information regarding links in the vicinity of the specific position in the second road network data, and a determination based on coordinate information regarding the specific position and the attribute infoin anon regarding the links in the vicinity of the specific position in the second road network data. The second information is acquired in such a way that a second information acquisition unit acquires the second information from the second map data based on the corresponding position. Guidance is performed using the second information by a guiding unit.

According to an aspect of the invention, there is provided a navigation program by which guidance is performed by using first map data containing first information, and second map data which is map data for a region in which coordinates of the second map data overlap coordinates of the first map data, and contains second information not contained in the first map data, in which the first map data and the second map data are stored in a map data storage unit, and the first map data contains first road network data indicating roads based on a connection relationship between multiple links, and first link group identification data identifying a first link group which is a link group formed of multiple continuous links in the first road network data, in which the second map data contains second road network data indicating roads based on a connection relationship between multiple links, and second link group identification data identifying a second link group which is a link group formed of multiple continuous links in the second road network data, and in which a correspondence between the second link group identification data and the first link group identification data is established, the program causing a computer to realize: a data updating function in which the first road network data and the second road network data can be independently updated by a data updating unit; a corresponding link group extraction function in which, in a case where a specific position is designated in the first road network data, a corresponding link group extraction unit acquires the first link group identification data containing a link on which the specific position is present, and extracts a corresponding link group, which is a link group indicated by the second link group identification data, corresponding to the first link group identification data, from the second road network data; a corresponding position determination function in which a corresponding position determination unit determines a corresponding position on a link contained in the corresponding link group, which is a position corresponding to the specific position, by making at least one determination of a determination based on attribute information regarding links in the vicinity of the specific position in the first road network data and attribute information regarding links in the vicinity of the specific position in the second road network data, and a determination based on coordinate information regarding the specific position and the attribute information regarding the links in the vicinity of the specific position in the second road network data; a second information acquisition function in which a second information acquisition unit acquires the second information from the second map data based on the corresponding position; and a guiding function in which a guiding unit performs guidance by using the second information.

The characteristics and advantages of the invention become apparent from the description of the embodiment given with reference to the accompanying drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
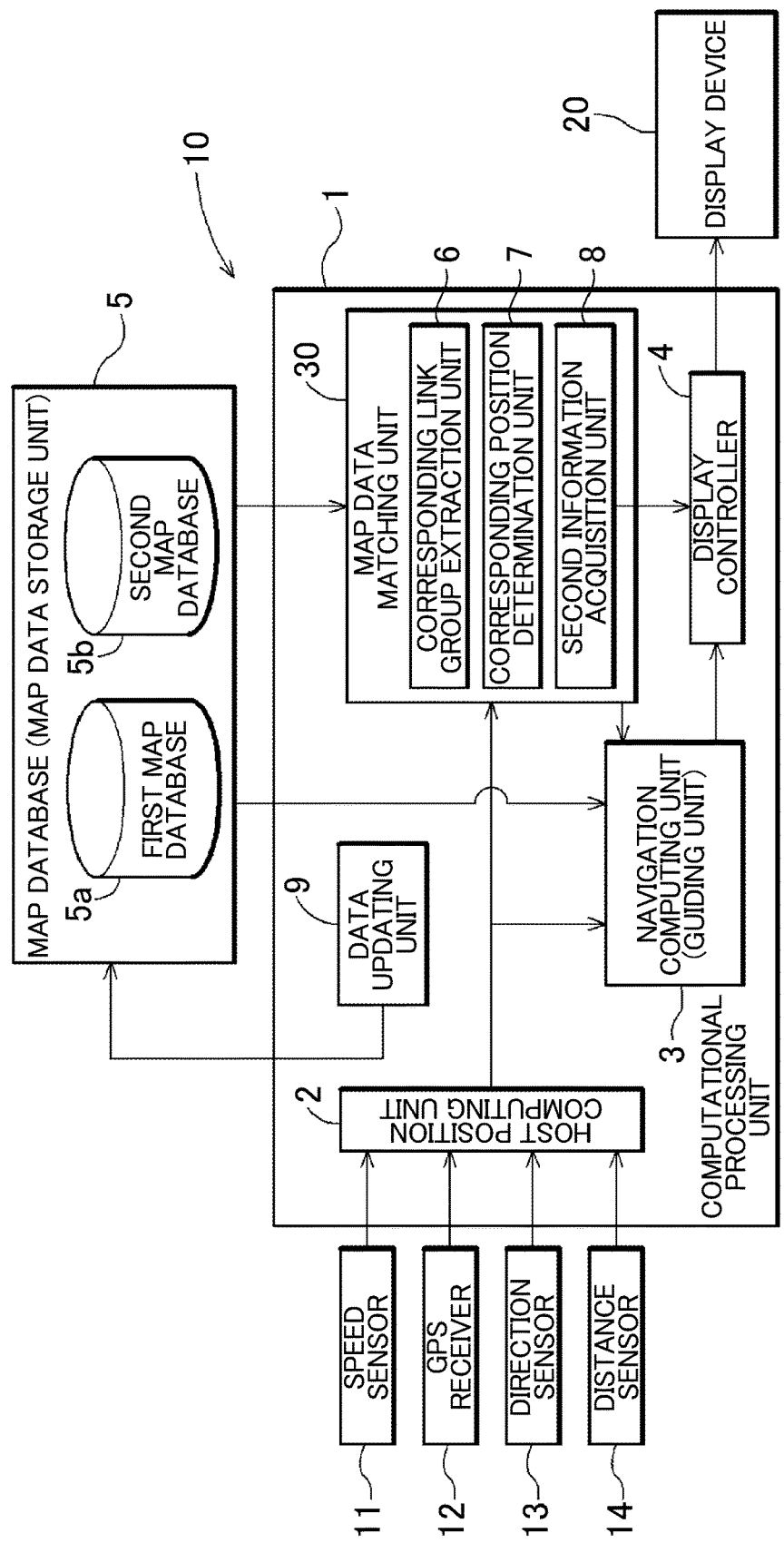
FIG. 1 is a schematic block diagram of a navigation device.

Hereinafter, an exemplary embodiment of a navigation device will be described with reference to the accompanying drawings. In the embodiment, a navigation device 10 mounted in a vehicle will be exemplarily described. The navigation device 10 may be a portable navigation device which can be arbitrarily moved. FIG. 1 is a schematic block diagram illustrating the system configuration of the navigation device 10. In the embodiment, the navigation device 10 is configured to include a computational processing unit 1 as a core component including computational processing devices such as microcomputers and digital signal processors (DSPs) as core members. The computational processing unit 1 realizes various functions of the navigation device 10 in collaboration with the computational processing devices such as microcomputers, storage mediums such as memories and disc devices, hardware such as peripheral circuits, and software such as programs and parameters used on the hardware. FIG. 1 does not illustrate all of the storage mediums, the peripheral circuits, and the like of the navigation device 10.

The computational processing unit 1 includes functional units such as a host position computing unit 2, the navigation computing unit (guiding unit) 3, and a display controller 4, which are configured with hardware and software. The host position computing unit 2 is a functional unit that specifies a hos position indicating the current position of the navigation device 10. In a case where the navigation device 10 is a vehicle-mounted navigation device fixedly mounted in a vehicle, the host position refers to the position of the navigation device 10, and the position of the vehicle. In a case where the navigation device 10 is a portable navigation device, the host position refers to at least the position of the navigation device 10. In a case where a portable navigation device is brought into a vehicle, the host position contains the position of the vehicle.

The host position computing unit 2 executes a host position information acquisition process in which host position information is acquired from a speed sensor 11, a GPS receiver 12, a direction sensor 13, and a distance sensor 14, and a host position specifying process in which a host position is specified based on the host position information, which will be described in detail later. The host position computing unit 2 computes and acquires the host position by using global positioning system (GPS) surveying, or autonomous control via dead reckoning. The GPS surveying is performed by using the GPS receiver 12. The autonomous control is performed based on an advancing speed detected by the speed sensor 11, an advancing direction detected by the direction sensor 13, and an advancing distance detected by the distance sensor 14.

The navigation computing unit 3 is a functional unit that executes a map information acquisition process in which at least map information regarding the vicinity of the host position is acquired from a map database (map data storage unit) 5, and a path guiding process in which a path to a destination is guided in a case where the destination is set. The display controller 4 is configured to include a graphic controller and the like as core components. The display controller 4 generates a map image in collaboration with the navigation computing unit 3, based on the host position information and the map information, and displays the map image on a display device 20. The display controller 4 outputs image data (for example, map images) according to specifications of the display device 20.

Figure 2:
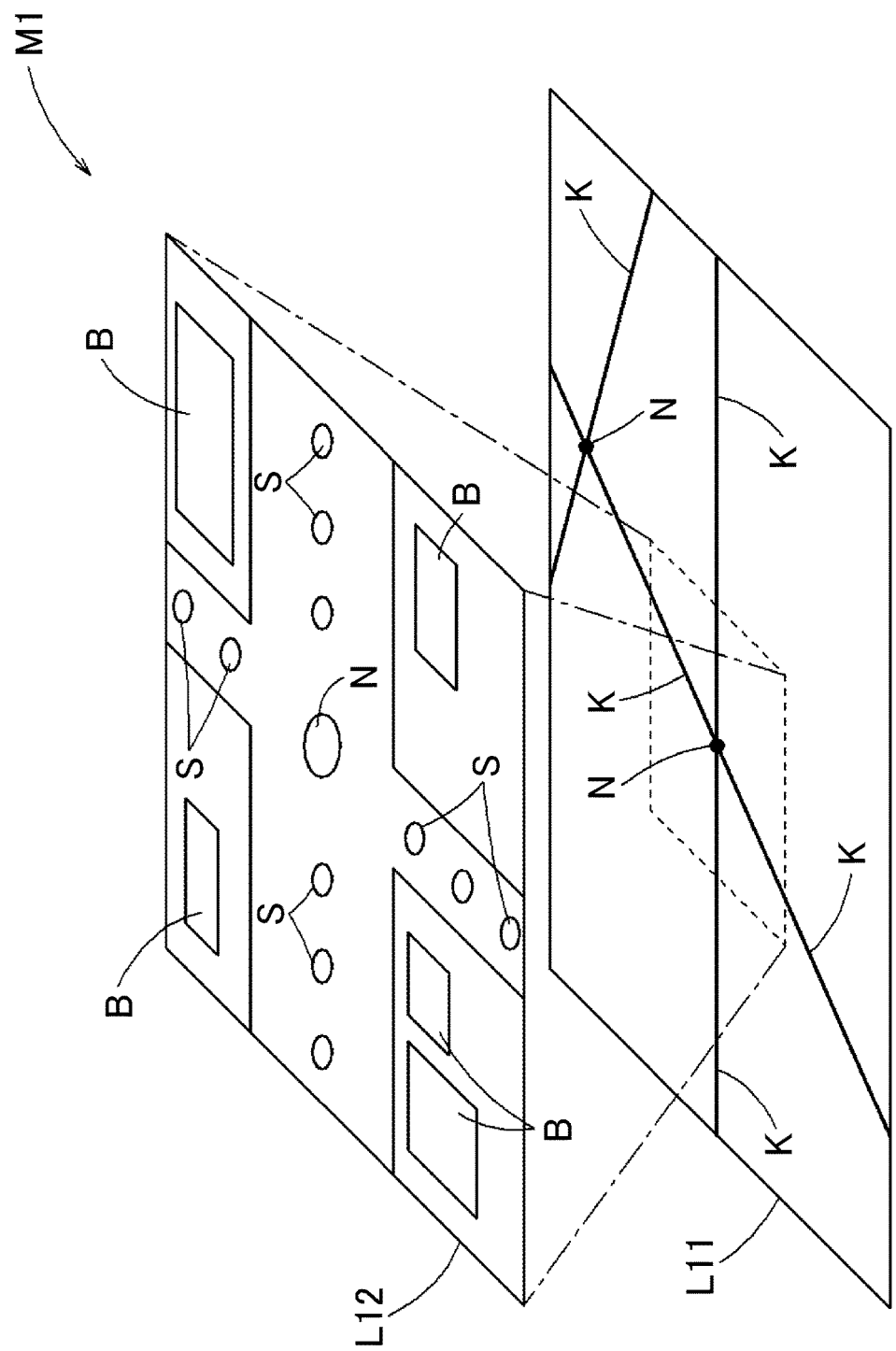
FIG. 2 is a schematic view illustrating an example of the data structure of first map data.
Figure 3:
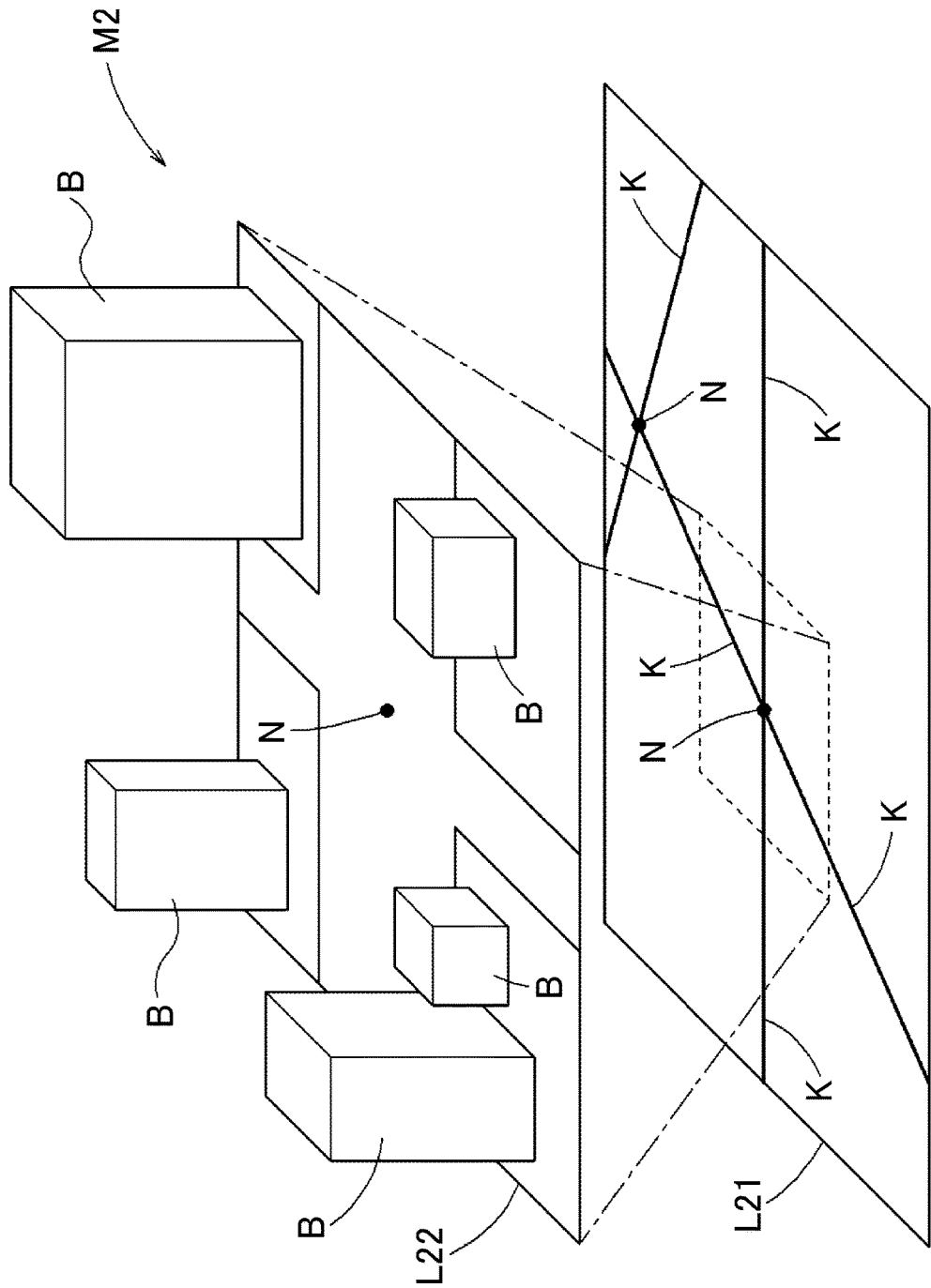
FIG. 3 is a schematic view illustrating an example of the data structure of second map data.

The map database 5 of the navigation device 10 is realized by a magnetic disc device, a solid state drive (SSD), or the like. In the example illustrated in the embodiment, two types of map data are stored in the map database 5. First map data containing first information is stored in a first map database 5a, and second map data containing second information is stored in a second map database 5b. The second map data is map data for a region in which the coordinates of the map data overlap the coordinates of the first map data, and map data containing the second information which is not contained in the first map data. The navigation device 10 performs guidance by using the first map data and the second map data. In the embodiment, as illustrated in FIGS. 2 and 3, the map database 5 is configured to have a layered structure. FIG. 2 is a schematic view illustrating the layered structure of first map data M1 stored in the first map database 5a. FIG. 3 is a schematic view illustrating the layered structure of second map data M2 stored in the second map database 5b.

In the embodiment, the first map data M1 contains a first road network layer L11 and a planar feature layer L12. The first road network layer L11 is the layer of first road network data indicating roads based on a connection relationship between multiple links. The planar feature layer L12 is a layer illustrating the shapes of various features in the vicinities of roads, and corresponds to the first information. The various features include structures B, signals, road surface markings (marking lines, crosswalks, and the like). The planar feature layer L12 is stored in association with the first road network layer L11. The first road network layer L11 is configured to contain information regarding many nodes N containing map positional information represented by latitudes and longitudes, and information regarding many links K, each of which forms a road by connecting two nodes N.

Each of the links K contains link attribute information regarding a road type (type such as an expressway, a toll road, a national road or a prefectural road), the length of a link, the shape of a link, and the like. The planar feature layer L12 is configured to contain information regarding many road shape supplementary points S, each of which is disposed between two nodes N (on a link K) and contains map positional information represented by a latitude and longitude, information regarding road widths, or the like.

In the embodiment, the second map data M2 contains a second road network layer L21, and a stereographic feature layer L22. The second road network layer L21 is the layer of second road network data indicating roads based on a connection relationship between multiple links. The stereographic feature layer L22 is a layer illustrating the stereographic shapes of various features in the vicinities of roads, and corresponds to the second information. The stereographic feature layer L22 is stored in association with the second road network layer L21. Similar to the first road network layer L11, the second road network layer L21 is also configured to contain information regarding many nodes N containing map positional information represented by latitudes and longitudes, and information regarding many links K, each of which forms a road by connecting two nodes N. Each of the links K contains link attribute information regarding a road type (type such as an expressway, a toll road, a national road or a prefectural road), the length of a link, the shape of a link, and the like. The stereographic feature layer L22 may contain information regarding the stereographic shapes of roads in addition to the stereographic shapes of stereographic features such as structures B, signs, pedestrian bridges in the vicinities of roads. The second information of the second map data M2 is information containing at least one of the three-dimensional shape, size, and color of a feature contained in the map data.

As described above, the first road network data and the second road network data are map data for a region in which both coordinates overlap with each other. That is, the first road network layer L11 and the second road network layer L21 are layers for a region in which both coordinates overlap with each other. As described above, the planar feature layer L12 corresponds to the first information contained in the first map data M1. The stereographic feature layer L22 corresponds to the second information which is not contained in the first map data M1.

The planar feature layer L12 is associated with the first road network layer (the first road network data) L11. The stereographic feature layer L22 is associated with the second road network layer (the second road network data) L21. In contrast, the first road network layer L11 is not associated with the stereographic feature layer L22. For example, in a case where the navigation computing unit 3 guides a path by using the first road network layer L11, and displays a map image on the display device 20 via the display controller 4, a computational result cannot be directly associated with the stereographic feature layer L22. A relationship between the planar feature layer L12 and the stereographic feature layer L22 is set in a similar manner.

Figure 4:
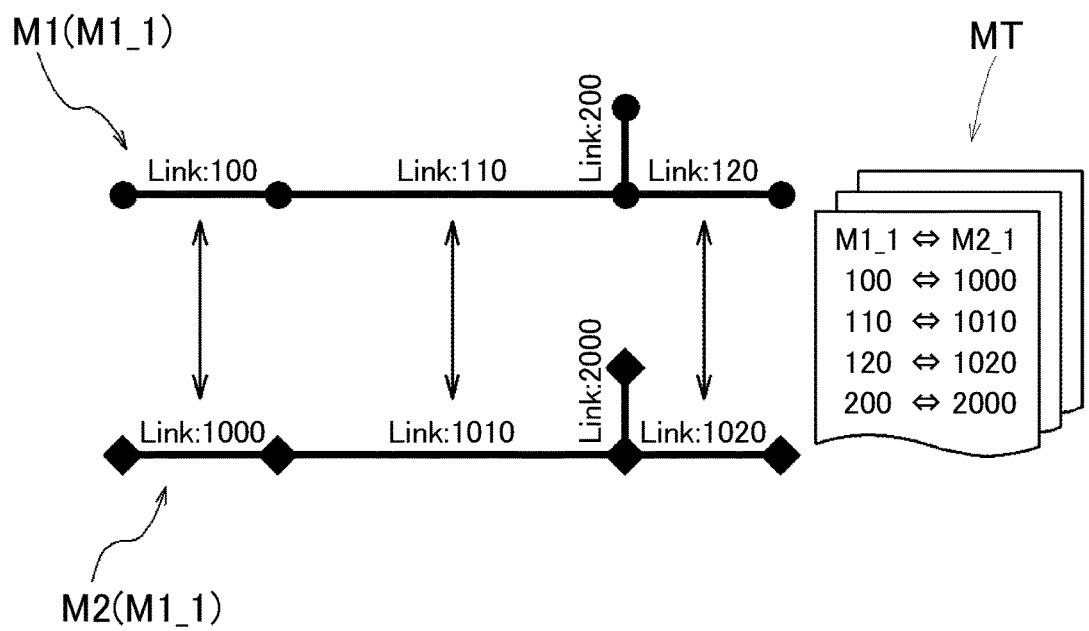
FIG. 4 is a view illustrating an example in which a correspondence between map data items can be established by using a correspondence table.

In a case where there is a consistency between the first road network layer (the first road network data) L11 and the second road network layer (the second road network data) L21, the first road network layer L11 can be indirectly associated with the stereographic feature layer L22. As illustrated in FIG. 4, it is possible to associate the first road network layer L11 with the stereographic feature layer L22 by preparing a correspondence table MT in which two map data items are associated with each other, and establishing a correspondence between links. The planar feature layer L12 is associated with the stereographic feature layer L22 in a similar manner.

FIG. 4 illustrates an example in which map data items having the same update timing, in the embodiment, links K of first map data (M1_1) of version 1 are associated with links K of second map data (M2_1) of version 1 in the correspondence table MT. In the correspondence table MT, Link:100 of the first map data is associated with Link:1000 of the second map data, Link:110 of the first map data is associated with Link:1010 of the second map data, Link:120 of the first map data is associated with Link:1020 of the second map data, and Link:200 of the first map data is associated with Link:2000 of the second map data. Such a correspondence is established such that the navigation computing unit 3 is capable of computing a path by using the first map data M1, and displaying a stereographic guidance screen on the display device 20 via the display controller 4 by using the second map data M2.

Actual roads, geographical features, or the like are frequently changed due to new construction and integration of roads, land development, or the like. That is, actual roads or landforms do not match the information contained in the first map data M1, or the second map data M2. Accordingly, preferably, the first map data M1, or the second map data M2 are properly updated. For this reason, the navigation device 10 includes a data updating unit 9. The data updating unit 9 acquires new map data, and updates the map data (M1, M2) stored in the map database 5 via a communication I/F (not illustrated), and interface with an external storage medium such as a memory card or an optical disc.

As described above, the map database (map data storage unit) 5 includes the first map database 5a in which the first map data M1 is stored, and the second map database in which the second map data M2 is stored. The first map data M1 and the second map data M2 are independent map data items. The data updating unit 9 is capable of independently updating the first map data M1 and the second map data M2. For example, The data updating unit 9 is capable of independently updating the first road network data and the second road network data. For this reason, only one map data item of the first map data M1 and the second map data M2 may be updated, and the other map data item may not be updated.

Figure 5:
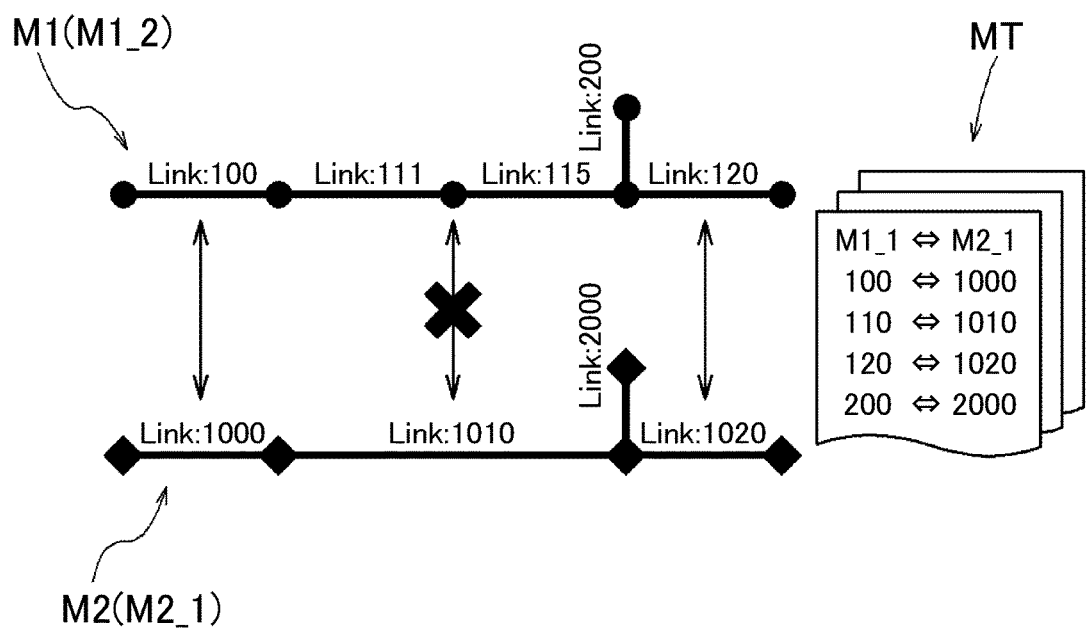
FIG. 5 is a view illustrating an example in which a correspondence between map data items cannot be established by using the correspondence table.

FIG. 5 illustrates an example in which only the first map data M1 is updated from version 1 to version 2, and the second map data is not updated and remains in version 1. The correspondence table MT is not updated, and the correspondence between versions 1 remains specified. That is, FIG. 5 illustrates an example in which first map data (M1_2) of version 2 is associated with the second map data (M2_1) of version 1 in the correspondence table MT similar to FIG. 4.

Since the correspondence table MT is not updated according to the updating of the first map data, there are links in the first map data M1 and the second map data M2 between which correspondences cannot be established. Specifically, Link:110 of the first map data M1 is divided into two links, that is, Link:111 and Link:115 by updating. In contrast, since Link:110 of the first map data M1 is associated with Link:1010 of the second map data M2 in the correspondence table MT, Link:111 and Link:115 of the first map data M1 cannot be associated with Link:1010 of the second map data M2.

In a case where the correspondence table MT is also updated according to the updating of the map data, it is possible to avoid such an inconsistency. In contrast, in a case where the correspondence table MT is added according to the updating of one map data item, the correspondence tables MT may be required to correspond to the number of combinations of map data versions, and the number of correspondence tables MT may be increased. Map data may be updated not only in its entirety but also by the unit of a specific region. In this case, combinations of the correspondence tables MT are increased, and the number of correspondence tables MT is increased according to updating. In the embodiment, a correspondence between the first map data M1 and the second map data M2 is established without intervention of the correspondence table MT. In the embodiment, a correspondence between the first map data M1 and the second map data M2 is established by using link group identification data (StreetID to be described later) identifying a link group formed of multiple continuous links in road network data, which will be described in detail later.

The first map data M1 is configured to contain first link group identification data (StreetID to be described later) identifying a first link group, that is, a link group formed of multiple continuous links in the first road network data, in addition to the first road network data. That is, the first map data M1 is configured to contain the first road network data and the first link group identification data (StreetID). The second map data M2 is configured to contain second link group identification data (StreetID to be described later) identifying a second link group, that is, a link group formed of multiple continuous links in the second road network data, in addition to the second road network data. That is, the second map data M2 is configured to contain the second road network data and the second link group identification data (StreetID). A correspondence between the second link group identification data and the first link group identification data is established. Specifically, the same link group identification data (StreetID) is assigned to link groups indicating the same road in the first map data M1 and the second map data M2. The first link group identification data is associated with the second link group identification data.

Figure 6:
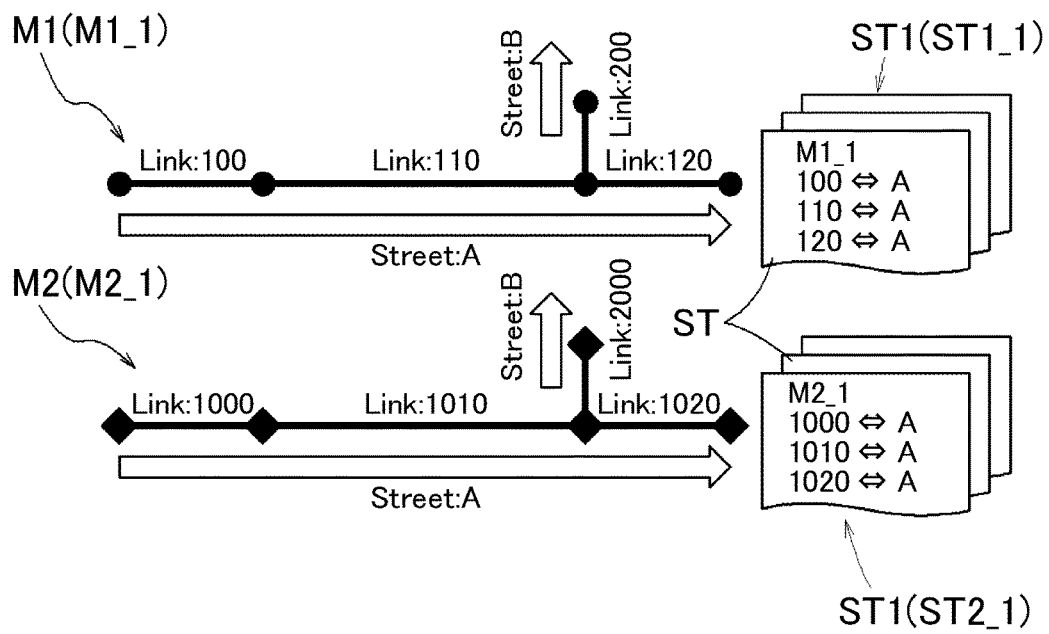
FIG. 6 is a view illustrating an example in which a correspondence between map data items is established by using link group identification data.
Figure 7:
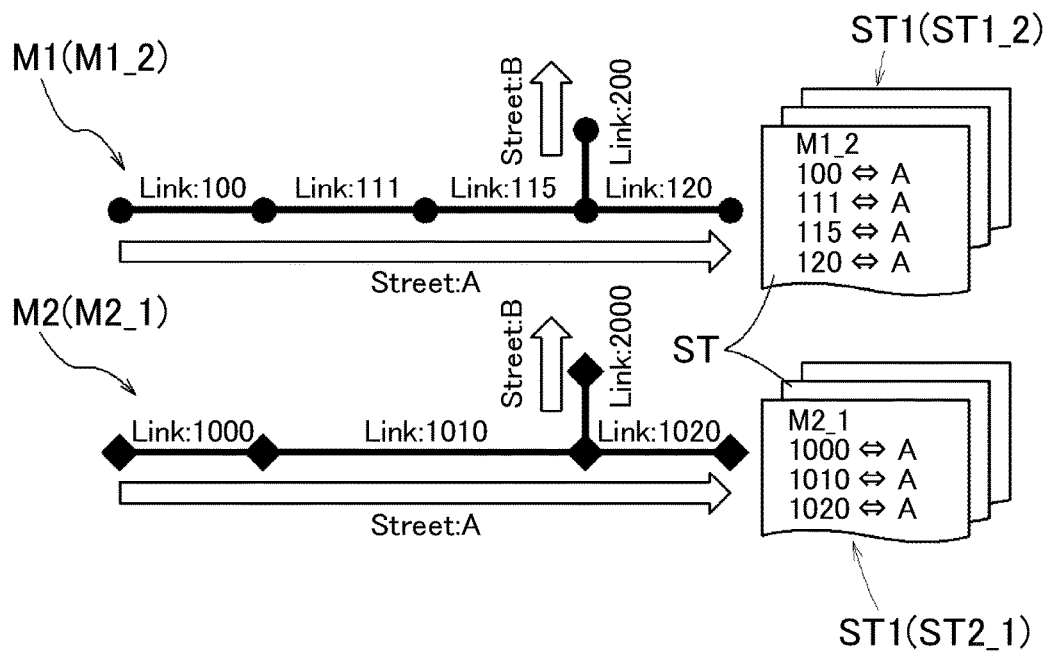
FIG. 7 is a view illustrating an example in which a correspondence between different versions of map data is established by using the link group identification data.

FIGS. 6 and 7 are schematic views illustrating a relationship between a link group and link group identification data. In the examples illustrated in FIGS. 4 and 5, the correspondence table MT is provided. In contrast, in the examples illustrated in FIGS. 6 and 7, an identification table ST (first identification table ST1) indicating the first link group identification data (StreetID) corresponding to the first map data, and an identification table ST (second identification table ST2) indicating the second link group identification data (StreetID) corresponding to the second map data are provided. Similar to the example in FIG. 4, FIG. 6 illustrates an example in which a correspondence between the links K of the first map data (M1_1) of version 1 and the links K of the second map data (M2_1) of version 1 is established via link group identification data (identification tables ST in StreetID is defined). Similar to the example in FIG. 5, FIG. 7 illustrates an example in which only the first map data M1 is updated to the first map data (M1_2) of version 2. Unlike the example in FIG. 5, in the example illustrated in FIG. 7, a correspondence between the links K of the first map data (M1_2) of version 2 and the links K of the second map data (M2_1) of version 1 is established via link group identification data (identification tables ST in StreetID is defined), which will be described in detail later.

Hereinafter, link groups and link group identification data (StreetID) will be described. As illustrated in FIG. 6, in the first map data M1, the first link group identification data (StreetID) referred to as "Street:A" is assigned to a link group formed of three continuous links (Link:100, Link:110, and Link:120). In FIG. 6, the connection of the links K is simply illustrated, and the first link group identification data (StreetID) referred to as "Street:B" is assigned to a link group containing "Link:200".

In the second map data M2, the second link group identification data (StreetID) referred to as "Street:A" is also assigned to a link group formed of three continuous links (Link:1000, Link:1010, and Link:1020). In the second map data M2, the second link group identification data (StreetID) referred to as "Street:B" is also assigned to a link group containing "Link:2000".

Link group "Link:100, Link:110, Link:120" in the first map data M1 correspond to link group "Link:1000, Link:1010, Link:1020" in the second map data M2. As described above, the first link group identification data (StreetID) referred to as "Street:A" is assigned to Link group "Link:100, Link:110, Link:120" in the first map data M1. The second link group identification data (StreetID) referred to as "Street:A" is also assigned to link group "Link:1000, Link:1010, Link:1020" in the second map data M2. That is, the same link group identification data (StreetID) is assigned to the corresponding link groups between the first map data M1 and the second map data M2. Link (link group) "Link:200" in the first map data M1 correspond to link (link group) "Link:2000" in the second map data M2. The same link group identification data (StreetID) referred to as "Street:B" is assigned to these link groups.

As such, in the example illustrated in FIG. 6, a table (for example, the correspondence table MT) for directly associating the links K of the first map data M1 with the links K of the second map data M2 is not provided. In contrast, it is possible to associate the first map data M1 with the second map data M2 by verifying the link group identification data (StreetID) referred to as "Street:A" or "Street:B". In other words, even in a case where the first map data M1 cannot be directly associated with the second map data M2, it is possible to associate the first map data M1 with the second map data M2 by verifying the link group identification data (StreetID).

In the example illustrated in FIG. 7, the version of the first map data (M12) is different from that of the second map data (M2_1). That is, as a result of updating the first map data M1, link group "Street:A" is different from that in the example illustrated in FIG. 6. Specifically, "Link:110" in the first map data (M1_1) of version 1 is divided into two links "Link:111" and "Link:115" in the first map data (M1_2) of version 2. As a result, in the first map data (M1_2) of version 2, the link group to which "Street:A" is assigned is a link group formed of four links (Link:100, Link:111, Link:115, and Link:120). In contrast, in the second map data (M2_1) of version 1, the link group, to which "Street:A" is assigned, is formed of three links similar to FIG. 6. In contrast, both the first map data (M1_2) and the second map data (M2_1) contain link groups to which link group identification data referred to as "Street:A" is assigned. For this reason, it is possible to associate the links K of the first map data (M1_2) with the links K of the second map data (M2_1) by verifying the link group identification data referred to as "Street:A".

Hereinafter, the order of establishing a correspondence between different versions of map data items by using link group identification data (StreetID) will be described with reference to the flowchart in FIG. 8. A correspondence between the map data items is established by a map data matching unit 30 illustrated in FIG. 1. The map data matching unit 30 is configured as a functional unit of the computational processing unit 1 configured to include a microcomputer as a core component. Similar to other functional units, functions of the map data matching unit 30 are realized by collaboration between hardware and software (program and the like). As illustrated in FIG. 1, the map data matching unit 30 includes a corresponding link group extraction unit 6; a corresponding position determination unit 7; and a second information acquisition unit 8.

The corresponding link group extraction unit 6 is a functional group that acquires the first link group identification data (StreetID) containing a link K on which the specific position P1 is present, and extracts a corresponding link group, that is, a link group indicated by the second link group identification data (StreetID), corresponding to the first link group identification data (StreetID), from the second road network data in a case where a specific position ("P1" to be described later) is designated in the first road network data. The corresponding position determination unit 7 is a functional unit that determines a corresponding position Q1 on a link K contained in the corresponding link group, that is, a position corresponding to the specific position P1. As an example, the corresponding position determination unit 7 determines the corresponding position Q1 based on attribute information regarding the links K in the vicinity of the specific position P1 in the first road network data, and attribute information regarding the links in the vicinity of the specific position P1 in the second road network data, which will be described later. As another example, the corresponding position determination unit 7 determines the corresponding position Q1 based on coordinate information regarding the specific position P1 and attribute information regarding the links K in the vicinity of the specific position P1 in the second road network data. The link attribute information contains information indicating the shape of each link. The second information acquisition unit 8 acquires the second information (L22) from the second map data M2 based on the corresponding position Q1. The navigation computing unit (guiding unit) 3 performs guidance based on the second information (L22).

When the host position computing unit 2 calculates a host position, the host position is designated as the specific position P1. The corresponding link group extraction unit 6 acquires link information "Link" regarding the first map data M1 based on the host position (the specific position P1) (#1). As illustrated in FIG. 8, in the embodiment, link information "Link:111" is acquired from the first map data (M1_2) based on the specific position P1. With reference to the identification table (ST1_2) corresponding to the first map data (M1_2) of version 2, the corresponding link group extraction unit 6 acquires "Street:A" which is the first link group identification data (StreetID) containing the link (Link:111) on which the specific position P1 is present.

The second link group identification data (StreetID) corresponding to "Street:A" of the first link group identification data (StreetID) is the same "Street:A". With reference to the identification table (ST2_1) corresponding to the second map data (M2_1), the corresponding link group extraction unit 6 extracts the corresponding link group, that is, a link group indicated by "Street:A" of the second link group identification data (StreetID), from the second road network data (#3). Specifically, "Link:1000, Link:1010, and Link:1020" are extracted from the second road network data. Steps #1 to #3 correspond to a corresponding link group extraction step (corresponding link group extraction function).

The corresponding position determination unit 7 determines whether a coincidence between the shapes (SP1) of links in the first map data (M1_2) and the shapes (SP2) of links in the second map data (M2_1) is within a threshold (#4). That is, the corresponding position determination unit 7 determines a correspondence between the links K in the vicinity of the specific position P1 and the links K contained in the corresponding link group by matching the shapes (SP1) of the links in the vicinity of the specific position P1 in the first road network data with the shapes (SP2) of the links contained in the corresponding link group. In a case where attribute information contains information indicating the shape of each link K, the determination corresponds to a determination made based on attribute information regarding the links K in the vicinity of the specific position P1 in the first road network data, and attribute information regarding the links K in the vicinity of the specific position P1 in the second road network data.

Figure 8:
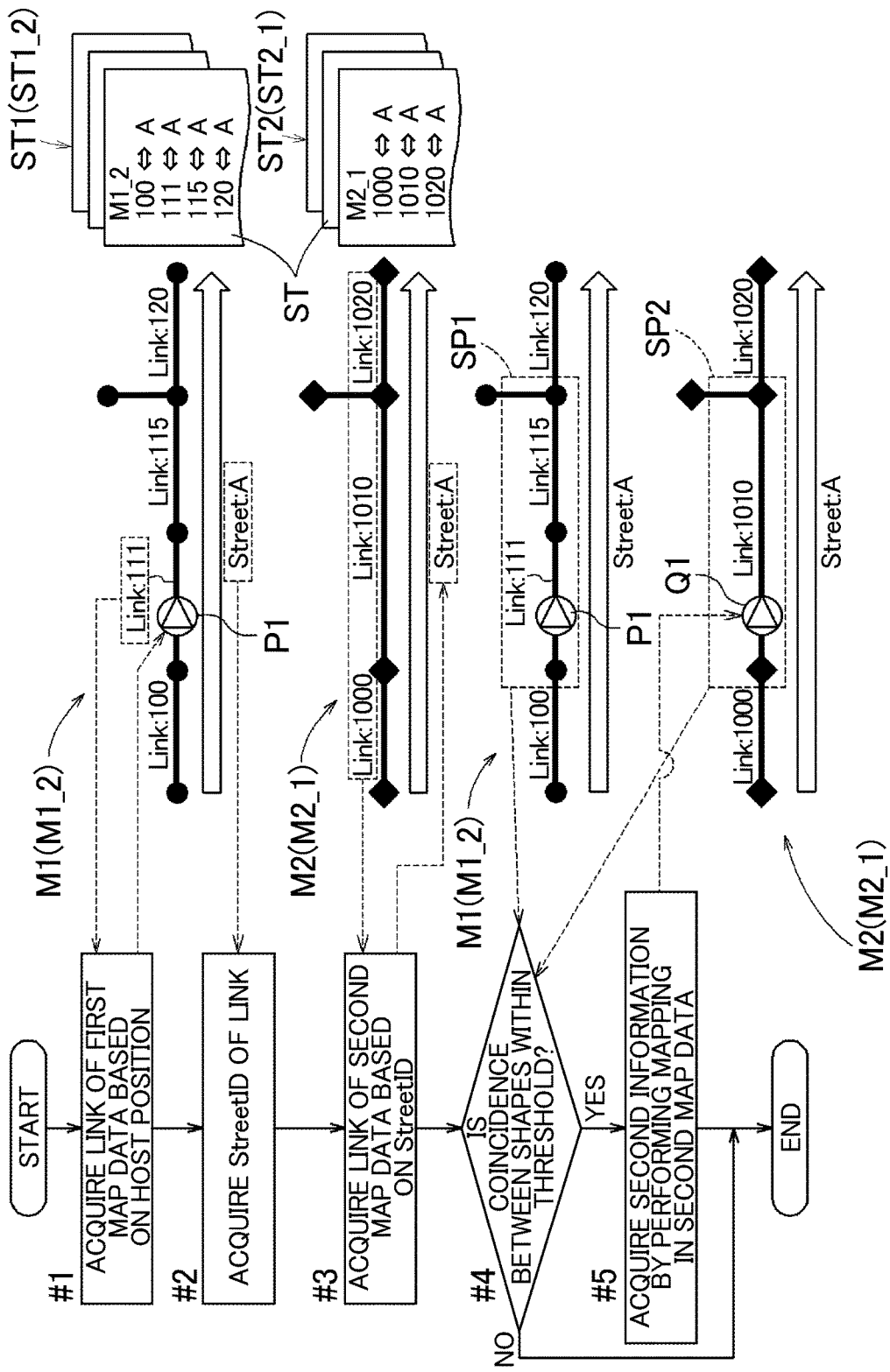
FIG. 8 is a schematic flowchart illustrating an example of the order of acquiring the second information, which corresponds to a specific position designated in the first map data, from the second map data.

In the example illustrated in FIG. 8, a coincidence between the shapes (SP1) of links "Link:111 and Link:115" in the first map data (M1_2) and the shapes (SP2) of link "Link:1010" in the second map data (M2_1) is within the threshold. Accordingly, the corresponding position determination unit 7 determines the corresponding position Q1 by mapping the specific position P1 on link "Link:111" in the first map data (M1_2) on corresponding link "Link:1010" in the second map data (M2_1) (#5). For example, the distance from a starting position of link "Link:1010" in the second map data (M2_1) is mapped to correspond to a distance corresponding to the distance from a starting point of link "Link:111" to the specific position P1 in the first map data (M1_2) such that the corresponding position Q1 is determined. The second information acquisition unit 8 acquires the second information from the second map data M2 based on the determined corresponding position Q1 (#5). Step #4 and a first half of Step #5 correspond to a corresponding position determination step (corresponding position determination function). A second half of Step #5 corresponds to a second information acquisition step (second information acquisition function).

Figure 9:
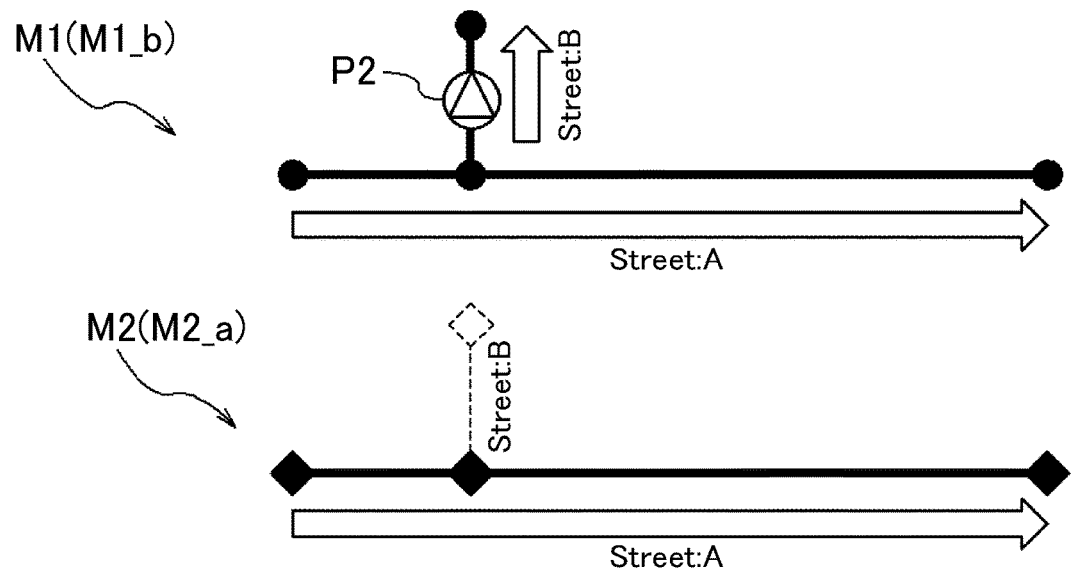
FIG. 9 is a view illustrating an example in which a correspondence between different versions of map data cannot be established, even by using the link group identification data.

In the example described with reference to FIG. 8, second link group identification data "Street:A" corresponding to first link group identification data "Street:A" is present in the second map data (M2_1). In contrast, as illustrated in FIG. 9, in a case where a road present in first map data (M1_*b*) of relatively new version "b" is not present in second map data (M2_*a*) of relatively old version "a", "Street:B" of the second link group identification data (StreetID) corresponding to "Street:B" of the first link group identification data (StreetID) is also not present. In a case where a host position (specific position P2) is designated in a link group defined by "Street:B" in the first map data (M1_*b*), it is not possible to determine the corresponding position Q1 in the second map data (M2_*a*).

A step of determining whether the first link group identification data (StreetID) of the link group, in which the specific position P2 is designated, is present in the second map data (M2_*a*), is omitted from Step #3 in FIG. 8. In contrast, preferably, the determination of the presence or non-presence is performed. In a case where the first link group identification data (StreetID) of the link group, in which the specific position P2 is designated, is not present in the second map data (M2_*a*), the process is ended without determining the corresponding position Q1 and acquiring the second information.

Similarly, in a case where a non-coincidence between the shapes (SP1 and SP2) of the links K is within the threshold in Step #4 performed by the corresponding position determination unit 7, the process is ended without mapping the specific position P1 to the corresponding position Q1, and acquiring the second information. That is, in a case where the corresponding position determination unit 7 performs shape matching, and no coincident shapes are present in Step #4, the corresponding position determination unit 7 ends determination without determining the corresponding position Q1.

Figure 10:
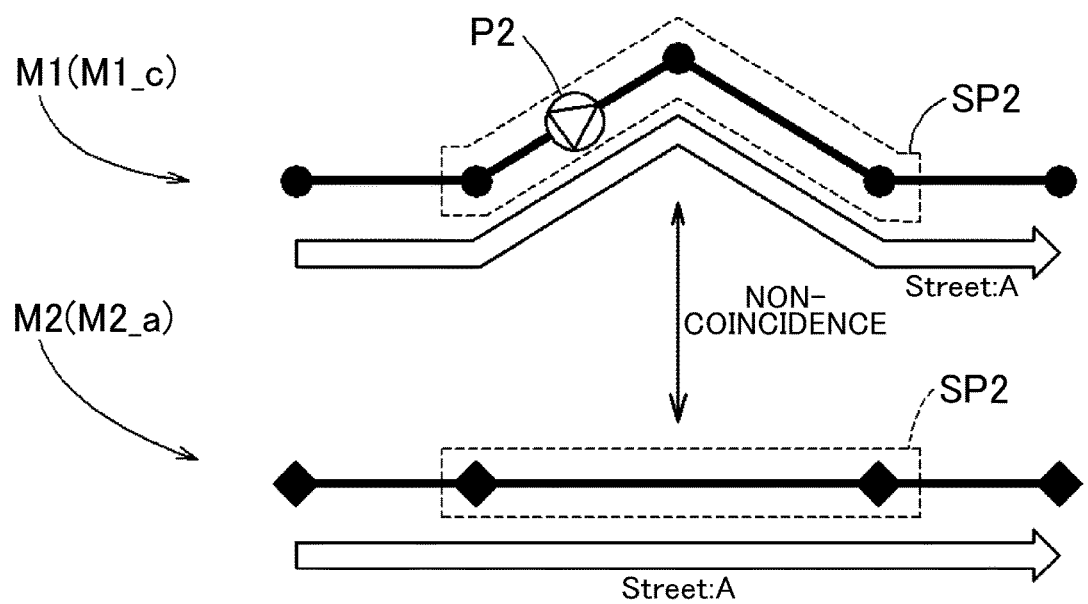
FIG. 10 is a view illustrating another example in which a correspondence between different versions of map data cannot be established, even by using the link group identification data.

In the example illustrated in FIG. 10, both of first map data (M1_c) of version "c" and the second map data (M2_a) of version "a" have "Street:A" as link group identification data (StreetID). In contrast, links in the vicinity of the specific position P1 have significantly different shapes. For example, a road on the same route may be changed due to replacement of the road. In this case, even if the corresponding position determination unit 7 performs shape matching, no coincident shapes may be present. Also, in this case, the corresponding position determination unit 7 ends the determination without determining the corresponding position Q1.

In the aforementioned description, symbols such as "Street:A", "Street:B", and the like are conveniently used as "StreetID". In contrast, in many cases, names such as "national road 1" or "xx road" are assigned at actual roads. Accordingly, the first link group and the second link group corresponding to each other are preferably formed of multiple links which form roads having the same actual road name. Each of the first link group identification data and the second link group identification data is preferably identification data corresponding to actual road name. The identification data is generated by letters, numbers, symbols, or combinations thereof.

[Other Embodiments]

Hereinafter, other embodiments will be described. The invention is not limited to a case in which the configuration of each of embodiments to be described below is individually adopted, and the configuration can be combined with the configurations of other embodiments insofar as there is no contradiction therebetween.

(1) In the aforementioned example, the first map data M1 is two-dimensional map data, and the second map data M2 is three-dimensional map data. The second information is information containing at least one of the three-dimensional shape, size, and color of a feature contained in map data. However, the invention is not limited to this configuration. For example, the first map data M1 is two-dimensional map data or three-dimensional map data, and the second map data M2 may be map data indicating the site positions of parking lots, gas stations, other stores, and the like. The second information may be information containing the types or sizes of stores and the like, display icons, and the like.

(2) In the aforementioned example given with reference to FIG. 8, the corresponding position determination unit 7 determines a correspondence between the links K in the vicinity of the specific position P1 and the links K contained in the corresponding link group by matching the shapes (SP1) of links in the vicinity of the specific position P1 in the first road network data with the shapes (SP2) of links contained in the corresponding link group. The determination is made based on the assumption that attribute information contains information indicating the shape of each link K. Accordingly, the determination corresponds to a determination made based on attribute information regarding the links K in the vicinity of the specific position P1 in the first road network data, and attribute information regarding the links K in the vicinity of the specific position P1 in the second road network data.

However, the way a correspondence is determined by the corresponding position determination unit 7 is not limited to this manner. For example, a corresponding link in the second road network data may be specified based on the shapes of links, and a point on the corresponding link closest to coordinate information regarding the specific position P1 may be determined as the corresponding position Q1. This determination corresponds to a determination made based on the coordinate information regarding the specific position P1 and the attribute information regarding the links K in the vicinity of the specific position P1 in the second road network data.

As another example, the corresponding position determination unit 7 may determine the corresponding position Q1 from the coordinate information regarding the specific position P1 without performing shape matching. For example, a coordinate closest to the coordinate of the specific position P1 on a corresponding link in the second road network data may be determined as the corresponding position Q1 based on the coordinate information regarding the specific position P1. Alternatively, a coordinate closest to the coordinate of the specific position P1 on corresponding link groups (link groups having the same StreetID) in the second road network data may be determined as the corresponding position Q1, based on the coordinate information regarding the specific position P1, and a link K containing the corresponding position Q1 may be determined as a corresponding link.

[Outline of Embodiments]

Hereinafter, an outline of a navigation device (10) according to the aforementioned embodiment will be briefly described.

According to an aspect of the invention, there is provided a navigation device (10) that performs guidance by using first map data (M1) containing first information (L12), and second map data (M2) which is map data for a region in which the coordinates of the second map data (M2) overlap the coordinates of the first map data (M1), and contains second information (L22) not contained in the first map data (M1), in which the first map data (M1) contains first road network data (L11) indicating roads based on a connection relationship between multiple links (K), and first link group identification data identifying a first link group which is a link group formed of multiple continuous links (K) in the first road network data (L11), in which the second map data (M2) contains second road network data (L21) indicating roads based on a connection relationship between multiple links (K), and second link group identification data identifying a second link group which is a link group formed of multiple continuous links (K) in the second road network data (L21), and in which a correspondence between the second link group identification data and the first link group identification data is established, the device (10) including: a map data storage unit (5) configured to store the first map data (M1) and the second map data (M2); a data updating unit (9) configured to be capable of independently updating the first road network data (L11) and the second road network data (L21); a corresponding link group extraction unit (6) configured to acquire the first link group identification data containing a link (K) on which a specific position (P1) is present, and to extract a corresponding link group, which is a link group indicated by the second link group identification data, corresponding to the first link group identification data, from the second road network data (L21) in a case where the specific position (P1) is designated in the first road network data (L11); a corresponding position determination unit (7) configured to determine a corresponding position (Q1) on a link (K) contained in the corresponding link group, which is a position corresponding to the specific position (P1) by making at least one determination of a determination based on attribute information regarding links (K) in the vicinity of the specific position (P1) in the first road network data (L11) and attribute information regarding links (K) in the vicinity of the specific position (P1) in the second road network data (L21), and a determination based on coordinate information regarding the specific position (P1) and the attribute information regarding the links (K) in the vicinity of the specific position (P1) in the second road network data (L21); a second information acquisition unit (8) configured to acquire the second information (L22) from the second map data (M2) based on the corresponding position (Q1); and a guiding unit (3) configured to perform guidance by using the second information (L22).

In this configuration, a table or the like for directly associating the first map data (M1) with the second map data (M2) is not provided. In contrast, since a correspondence between the second link group identification data and the first link group identification data is established, it is possible to indirectly associate the second map data (M2) with the first map data (M1). Accordingly, even in a case where the first map data (M1) cannot be directly associated with the second map data (M2) due to different update timings, it is possible to associate the first map data (M1) with the second map data (M2) by verifying the first link group identification data and the second link group identification data. With regard to this association, the corresponding position determination unit (7) determines the corresponding position (Q1) corresponding to the specific position (P1). In a case where a relatively large difference in the road network data is present between the first map data (M1) and the second map data (M2), the first map data (M1) cannot be associated with the second map data (M2). For this reason, it is possible to avoid establishment of an improper correspondence. As such, in this configuration, it is possible to maintain a correspondence between different types of map data as much as possible even if there is an inconsistency between updated states of the map data items in the navigation device using multiple map data items which are independently updated.

The attribute information preferably contains information indicating the shape of each link (K). Preferably, the corresponding position determination unit (7) determines a correspondence between the links (K) in the vicinity of the specific position (P1) and the links (K) contained in the corresponding link group by matching the shapes of the links (K) in the vicinity of the specific position (P1) in the first road network data (L11) with the shapes of the links (K) contained in the corresponding link group, and determines the corresponding position (Q1) based on the correspondence. Even if the connection relationship between the links (K) is changed, in a case where the shapes of the links (K) in the first link group identification data and the second link group identification data corresponding to each other are coincident, it is possible to properly determine the corresponding position (Q1) corresponding to the specific position (P1). Accordingly, it is possible to accurately determine the corresponding position (Q1) by performing shape matching.

In a case where the shape matching is performed, and no coincident shapes are present, the corresponding position determination unit (7) preferably ends the determination without determining the corresponding position (Q1).

In a case where the shapes of roads are significantly changed, it is improper to unreasonably establish a correspondence between the first map data (M1) and the second map data (M2). Accordingly, in a case where the shape matching is performed, and it is determined that no coincident shapes are present, the corresponding position (Q1) is preferably not determined.

The first link group and the second link group corresponding to each other are preferably formed of multiple links (K) which form roads having the same actual road name. Each of the first link group identification data and the second link group identification data is preferably identification data corresponding to actual road name. The link groups, to which the first link group identification data and the second link group identification data are assigned, are preferably a group of links which are not significantly changed over time when the map data is updated, and can be used for a long period of time. A route having a road name is likely to satisfy such a condition. In a case where the name of the route is used in identification data, maintenance of the map data becomes easy.

The first map data (M1) is preferably two-dimensional map data. The second map data (M2) is preferably three-dimensional map data. The second information (L22) is preferably information containing at least one of the three-dimensional shape, size, and color of a feature contained in map data. Three-dimensional data has a large data size, and the updating of the three-dimensional data is not easy compared to two-dimensional data. Accordingly, the two-dimensional map data may be frequently updated. In contrast, performance of an information processing device is improved, and the demand for three-dimensional data having high visibility is increased. For this reason, collaboration, in which two-dimensional map data highly frequently updated is used for the guidance of a path, and three-dimensional map data is used for display, is considered to be increased. It is possible to realize the navigation device (10) which is highly convenient in a case where it is possible to use two-dimensional map data and three-dimensional map data in a state where updating timings are different but a correspondence between map data can be established.

Various technical characteristics of the navigation device (10) can also be applied to a navigation method and a navigation program. Hereinafter, representative aspects will be exemplarily illustrated. The navigation method is capable of having various steps including the characteristics of the navigation device (10). The navigation program is capable of causing a computer to realize various functions including the characteristics of the navigation device (10). Naturally, the navigation method and the navigation program are also capable of having effects of the navigation device (10). Various additional characteristics exemplarily illustrated as preferred aspects of the navigation device (10) can also be incorporated into the navigation method or the navigation program. The method and the program are capable of having effects corresponding to the additional characteristics.

According to an aspect of the invention, there is provided a navigation method by which guidance is performed by using first map data (M1) containing first information (L12), and second map data (M2) which is map data for a region in which the coordinates of the second map data (M2) overlap the coordinates of the first map data (M1), and contains second information (L22) not contained in the first map data (M1), in which the first map data (M1) and the second map data (M2) are stored in a map data storage unit (5), and the first map data (M1) contains first road network data (L11) indicating roads based on a connection relationship between multiple links (K), and first link group identification data identifying a first link group which is a link group formed of multiple continuous links (K) in the first road network data (L11), in which the second map data (M2) contains second road network data (L21) indicating roads based on a connection relationship between multiple links (K), and second link group identification data identifying a second link group which is a link group formed of multiple continuous links (K) in the second road network data (L21), in which a correspondence between the second link group identification data and the first link group identification data is established, and in which the first road network data and the second road network data can be independently updated by a data updating unit, the method including: a data updating step in which the first road network data (L11) and the second road network data (L21) can be independently updated by a data updating unit (9); a corresponding link group extraction step (#1, #2, #3) in which, in a case where a specific position (P1) is designated in the first road network data (L11), a corresponding link group extraction unit (6) acquires the first link group identification data containing a link (K) on which the specific position (P1) is present, and extracts a corresponding link group, which is a link group indicated by the second link group identification data, corresponding to the first link group identification data, from the second road network data (L21); a corresponding position determination step (#4, #5) in which a corresponding position determination unit (7) determines a corresponding position (Q1) on a link (K) contained in the corresponding link group, which is a position corresponding to the specific position (P1), by making at least one determination of a determination based on attribute information regarding links (K) in the vicinity of the specific position (P1) in the first road network data (L11) and attribute information regarding links (K) in the vicinity of the specific position (P1) in the second road network data (L21), and a determination based on coordinate information regarding the specific position (P1) and the attribute information regarding the links (K) in the vicinity of the specific position (P1) in the second road network data (L21); and a second information acquisition step (#5) in which a second information acquisition unit (8) acquires the second information (L22) from the second map data (M2) based on the corresponding position (Q1); and a guiding step in which a guiding unit (3) performs guidance by using the second information (L22).

According to an aspect of the invention, there is provided a navigation program by which guidance is performed by using first map data (M1) containing first information (L12), and second map data (M2) which is map data for a region in which the coordinates of the second map data (M2) overlap the coordinates of the first map data (M1), and contains second information (L22) not contained in the first map data (M1), in which the first map data (M1) and the second map data (M2) are stored in a map data storage unit (5), and the first map data (M1) contains first road network data (L11) indicating roads based on a connection relationship between multiple links (K), and first link group identification data identifying a first link group which is a link group formed of multiple continuous links (K) in the first road network data (L11), in which the second map data (M2) contains second road network data (L21) indicating roads based on a connection relationship between multiple links (K), and second link group identification data identifying a second link group which is a link group formed of multiple continuous links (K) in the second road network data (L21), and in which a correspondence between the second link group identification data and the first link group identification data is established, the program causing a computer to realize: a data updating function in which the first road network data (L11) and the second road network data (L21) can be independently updated by a data updating unit (9); a corresponding link group extraction function in which, in a case where a specific position (P1) is designated in the first road network data (L11), a corresponding link group extraction unit (6) acquires the first link group identification data containing a link (K) on which the specific position (P1) is present, and extracts a corresponding link group, which is a link group indicated by the second link group identification data, corresponding to the first link group identification data, from the second road network data (L21); a corresponding position determination function in which a corresponding position determination unit (7) determines a corresponding position (Q1) on a link (K) contained in the corresponding link group, which is a position corresponding to the specific position (P1), by making at least one determination of a determination based on attribute information regarding links (K) in the vicinity of the specific position (P1) in the first road network data (L11) and attribute information regarding links (K) in the vicinity of the specific position (P1) in the second road network data (L21), and a determination based on coordinate information regarding the specific position (P1) and the attribute information regarding the links (K) in the vicinity of the specific position (P) in the second road network data (L21); a second information acquisition function in which a second information acquisition unit (8) acquires the second information (L22) from the second map data (M2) based on the corresponding position (Q1); and a guiding function in which a guiding unit (3) performs guidance by using the second information (L22).

The invention can be applied to a navigation device that performs guidance by using map data items containing different information, the coordinates of both of which overlap with each other.

What is claimed is:

1. A navigation device that performs guidance by using first map data containing first information, and second map data which is map data for a region in which coordinates of the second map data overlap coordinates of the first map data, and contains second information not contained in the first map data, the device comprising:
    a map database; and
    a processor configured to interact with a plurality of sensors and a global positioning system (GPS) receiver, and using information received from the plurality of sensors and the GPS receiver, configured to act as:
        a data updating unit;
        a corresponding link group extraction unit;
        a corresponding position determination unit;
        a second information acquisition unit; and
        a guiding unit,
    wherein the first map data contains first road network data indicating roads based on a connection relationship between multiple links, and first link group identification data identifying a first link group which is a link group formed of multiple continuous links in the first road network data,
    wherein the second map data contains second road network data indicating roads based on a connection relationship between multiple links, and second link group identification data identifying a second link group which is a link group formed of multiple continuous links in the second road network data,
    wherein a correspondence between the second link group identification data and the first link group identification data is established,
    wherein the map database stores the first map data and the second map data,
    wherein the data updating unit is capable of independently updating the first road network data and the second road network data, wherein, in a case where a specific position is designated in the first road network data, the corresponding link group extraction unit acquires the first link group identification data containing a link on which the specific position is present, and extracts a corresponding link group, which is the link group indicated by the second link group identification data, corresponding to the first link group identification data, from the second road network data, wherein the corresponding position determination unit determines a corresponding position on a link contained in the corresponding link group, which is a position corresponding to the specific position by making at least one determination based on attribute information regarding links in a vicinity of the specific position in the first road network data and attribute information regarding links in a vicinity of the specific position in the second road network data, and a determination based on coordinate information regarding the specific position and the attribute information regarding the links in the vicinity of the specific position in the second road network data, wherein the second information acquisition unit is configured to acquire the second information from the second map data based on the corresponding position, and wherein the guiding unit performs guidance in which a path to a destination is guided, by using the second information acquired by the second information acquisition unit.

2. The navigation device according to claim 1,
wherein the attribute information regarding links in the vicinity of the specific position in the first road network data contains information indicating a shape of each of the links in the vicinity of the specific position in the first road network data, and wherein the corresponding position determination unit determines a correspondence between the links in the vicinity of the specific position and the link contained in the corresponding link group by matching the shape of each of the links the vicinity of the specific position in the first road network data with shapes of the links contained in the corresponding link group, and determines the corresponding position based on the correspondence determined by the corresponding position determination unit.

3. The navigation device according to claim 2,
wherein, in a case where the matching of the shape is performed, and no coincident shapes are present, the corresponding position determination unit ends the determination of the correspondence between the links in the vicinity of the specific position and the link contained in the corresponding link group without determining the corresponding position.

4. The navigation device according to claim 1,
wherein each of the first link group identification data and the second link group identification data is identification data corresponding to an actual road name, and wherein the first link group and the second link group are formed of links of the multiple links, the links forming roads having a same actual road name.

5. The navigation device according to claim 1,
wherein the first map data is two-dimensional map data, wherein the second map data is three-dimensional map data, and wherein the second information is information containing at least one of a three-dimensional shape, size, and color of a feature contained in map data.

6. A navigation method by which guidance is performed by using first map data containing first information, and second map data which is map data for a region in which coordinates of the second map data overlap coordinates of the first map data, and contains second information not contained in the first map data, the method comprising:

receiving information from a plurality of sensors and global positioning system (GPS) receiver;
data updating;
corresponding link group extracting;
corresponding position determining;
second information acquiring; and
guiding, wherein the first map data and the second map data are stored in a map database, and the first map data contains first road network data indicating roads based on a connection relationship between multiple links, and first link group identification data identifying a first link group which is a link group formed of multiple continuous links in the first road network data, wherein the second map data contains second road network data indicating roads based on a connection relationship between multiple links, and second link group identification data identifying a second link group which is a link group formed of multiple continuous links in the second road network data, wherein a correspondence between the second link group identification data and the first link group identification data is established, wherein the first road network data and the second road network data can be independently updated by a data updating unit, wherein, in a case where a specific position is designated in the first road network data, a corresponding link group is extracted in such a way that a corresponding link group extraction unit acquires the first link group identification data containing a link on which the specific position is present, and extracts the corresponding link group, which is the link group indicated by the second link group identification data, corresponding to the first link group identification data, from the second road network data, wherein a corresponding position is determined in such a way that a corresponding position determination unit determines the corresponding position on a link contained in the corresponding link group, which is a position corresponding to the specific position, by making at least one determination based on attribute information regarding links in the vicinity of the specific position in the first road network data and attribute information regarding links in a vicinity of the specific position in the second road network data, and a determination based on coordinate information regarding the specific position and the attribute information regarding the links in a vicinity of the specific position in the second road network data, and wherein the second information is acquired in such a way that a second information acquisition unit acquires the second information from the second map data based on the corresponding position, and wherein guidance in which a path to a destination is guided is performed by a guiding unit that uses the acquired second information.

* * * * *